April 29, 1969     T. R. KRAMER     3,440,698

HAND OPERATED EXTRUDING APPARATUS

Filed Sept. 26, 1966

INVENTOR.
TERENCE R. KRAMER
BY Eugene M. Eckelman
ATTORNEY

United States Patent Office 3,440,698
Patented Apr. 29, 1969

3,440,698
HAND OPERATED EXTRUDING APPARATUS
Terence R. Kramer, 1226 SE. 35th Ave.,
Portland, Oreg. 97214
Filed Sept. 26, 1966, Ser. No. 582,096
Int. Cl. B28b 3/24
U.S. Cl. 25—11     2 Claims

ABSTRACT OF THE DISCLOSURE

A hand operated extruding apparatus has a cylinder for holding a supply of extrudable material. This cylinder fits on an upright projection and has an outlet aperture arranged for alignment with any one of a number of forming apertures on a die member rotatably and slidably mounted on the cylinder. The die member is removable and may be inverted on the cylinder. It has two sets of forming apertures one set being adjacent one end thereof and the other set being adjacent the other end whereby a plurality of forming apertures may be provided for alignment one at a time with the outlet aperture in the cylinder upon suitable positioning of the die member. The cylinder is held on the projection by a set screw which also serves as an abutment for holding the die member in a forming position. A plunger operates in the cylinder and is associated with a hand operated lever and a ratchet drive means arranged upon operation of the lever to drive the plunger either in advancing or retracting movements.

---

This invention relates to new and useful improvements in hand operated extruding apparatuses.

A primary objective of the present invention is to provide an extruding apparatus which is designed particularly for use by students in the formation of articles from an extruded strip of soft, pliable material such as certain clay products, although it is to be understood that it may have any other use as necessary.

Another object of the present invention is to provide an extruding apparatus which is compact in structure and convenient in use, and furthermore which is easily and rapidly filled with material to be extruded.

Another object is to provide an extruding apparatus which employs a novel arrangement of lever operated plunger wherein the plunger and lever therefor are constructed and arranged to facilitate easy use of the apparatus.

Still another object is to provide a hand operated extruding apparatus having a novel cylinder for the material and a novel arrangement of die member associated therewith wherein various shapes of extruded products may be provided by a simple change of position of the die member.

Yet another object is to provide a hand operated extruding apparatus which is readily cleaned.

Additional objects and advantages will become apparent from the following description taken in connection with the accompanying drawings which illustrate a preferred form of the device.

Figure 5:
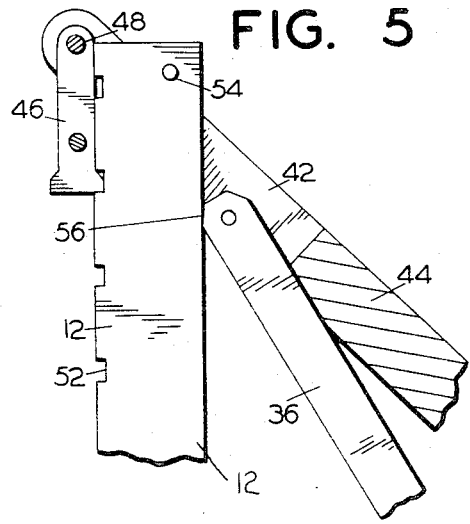
FIGURE 5 is an enlarged, fragmentary detail view of lever means for operating an extruding plunger.

Referring in particular to the drawings, the present apparatus employs a base plate 10 to which is integrated an upright standard 12 at the rearward end of the base 10 and a cylindrical projection 14 just forward of the standard 12. The base 10 may be secured to a supporting surface such as to a counter, bench or the like, or if desired it may be secured, as by screws 16 to a plate 18 capable of supporting the apparatus in an upright position and allowing the unit to be moved from place to place.

The projection 14 forms a support for a tubular cylinder or holder 20 which is elongated to hold a generous supply of extrudable material 22 such as a soft pliable clay and which has a selected diameter to fit rather snugly but removably on the projection 14 and be held in an upright position substantially parallel with the standard 12. The upper end 23 of the cylinder 20 is angled which as will be seen hereinafter facilitates easy insertion of a plunger or a supply of extrudable material therein. Cylinder 20 is locked in place on the projection 14 by a screw 24 having a knurled head 26.

Figure 2:
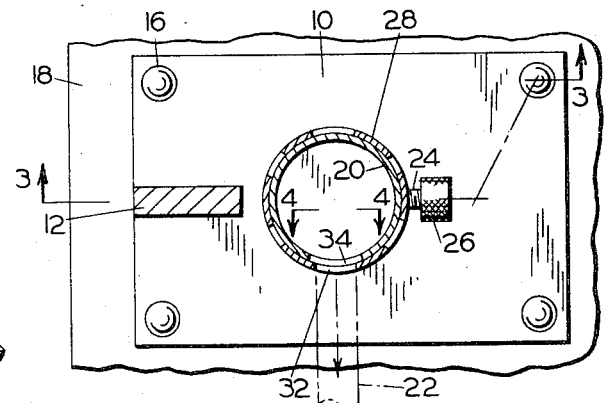
FIGURE 2 is an enlarged, fragmenttary sectional view taken on the line 2—2 of FIGURE 1.
Figure 4:
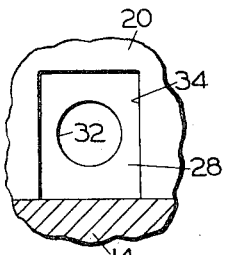
FIGURE 4 is an enlarged, fragmentary sectional view taken on the line 4—4 of FIGURE 2.
Figure 1:
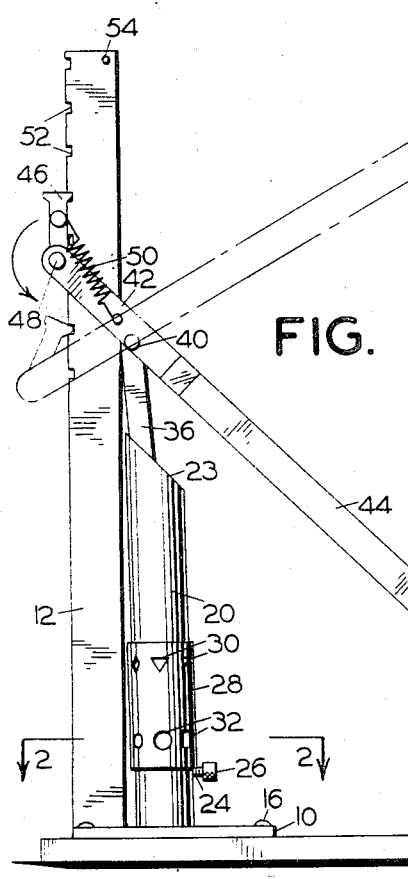
FIGURE 1 is a side elevational view of the present hand operated extruding apparatus.
Figure 3:
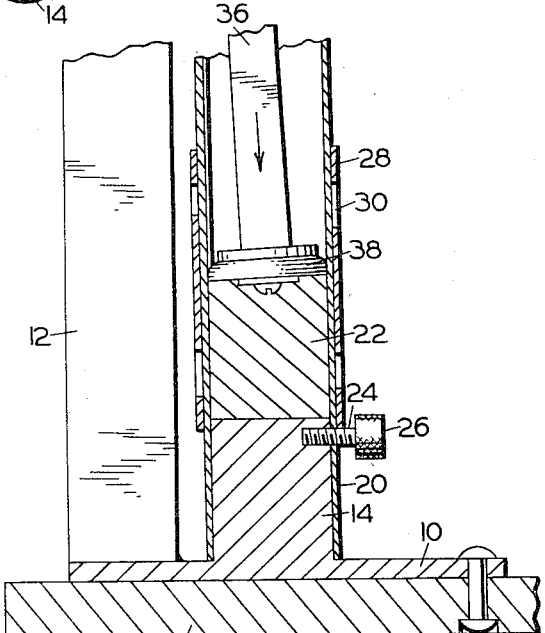
FIGURE 3 is a cross sectional view taken on the offset line 3—3 of FIGURE 2.

Associated with the cylinder 20 is a tubular die member 28 having upper and lower sets of forming apertures 30 and 32, respectively. Cylinder 20 has an outlet aperture 34 FIGURES 2 and 4 which is located in the cylinder so as to be disposed just above the top of projection 14 and adapted for alignment with one set of the apertures 30 or 32. The sets of apertures 30 and 32 as well as the outlet aperture 34 are arranged such that in one upright position of the die member 28 the one set of apertures 32 are adapted for alignment with the outlet aperture 34 and in an inverted position of the die member 28 the apertures 30 are adapted for alignment with the outlet aperture 34. Furthermore, the parts are dimensioned and arranged such that the die member 28 is supported on the screw 24 in an extruding position, either in its upright or inverted position. As best seen in FIGURE 1, the apertures 30 and 32 may be of varying sizes and shapes, and with the sets of apertures provided adjacent to both ends of the die member 28 an ample variety of extruding shapes is available.

The extrudable material 22 is forced through the outlet aperture 34 and thence through selected ones of the forming apertures 30 and 32 by a plunger 36 having a head 38 which slides within the cylinder 20. The upper end of the plunger 36 has a pivotal connection, as by means of a pin 40, to the forked end 42 of a forwardly projecting lever handle 44. The yoke 42 projects on opposite sides of the standard 12, and supports a dog 46 on the backside of the latter. The dog 46 is pivotally supported by means of a cross pin 48, and is held in either upwardly or downwardly directed, over-center, operative positions by a tension spring 50 suitably connected between the lever 44 and the said dog.

Dog 46 is adapted for engaging notches 52 provided in selective spaced relation on the back edge of the standard 12.

In the operation of the present device, the dog 46 is released from notches 52, as by merely holding the same disengaged by one hand, and the handle and plunger are lifted bodily upwardly to raise the plunger, in the cylinder 20. Standard 12 and plunger 36 are of a related length such that when the handle is moved to the upper end of the standard 12 the plunger is free of the upper end of the cylinder. Thus, to load the cylinder 20 with an extrudable material 22, the handle 44 is moved upwardly to the uppermost notch 52 to clear the plunger from the cylinder and extrudable material is then pushed downwardly through the open upper end of the cylinder. Upon suitable loading of the cylinder, the plunger 36 is guided into the open upper end thereof while moving the assembly downwardly. The head 38 of the plunger will then rest on the upper surface of the extrudable material to support the handle and by suitably pivoting the handle 44 to an upwardly angled position, as shown in phantom lines in FIGURE 1, the dog 46 will engage one of the notches 52. Upon forceful movement of the handle 44 downwardly, plunger 36 moves therewith and forces extrudable material out through the outlet aperture 34 and selected one of the forming apertures 30 and 32. After a complete stroke of the handle has been completed, it is again pivoted upwardly and the dog 46 drops down to a lower notch in a ratcheting movement.

Although the handle and plunger assembly may be readily raised merely by manual disengaging the dog 46 from the notches and then pulling upwardly on the same to bodily lift the same, as when it is desired to refill the cylinder, the said assembly may be ratcheted upwardly by reversing the dog, namely moving it to a downwardly directed position, and working the handle in a ratcheting movement.

The upper end of the standard 12 is provided with an abutment pin 54 which limits the upward movement of the handle 44 to avoid inconvenience caused by accidental displacement of the lever and plunger assembly off the top end of the standard. Also, as a matter of convenience in operation, the upper end of plunger 36 has an angled surface 56, FIGURE 5, on the corner edge adjacent to the standard 12. This angled edge serves to hold the plunger 36 in an outwardly directed position as shown in FIGURE 5 when the said plunger is disengaged from the holder 20 and the lever 44 rests on the standard in an inoperative position such as when the cylinder is being filled. Since the cylinder and other parts associated therewith are readily dismantled, the apparatus can be easily cleaned. To take the unit apart for cleaning it is merely necessary to remove the screw 24 and separate the cylinder from the projection 14. The die member is readily moved off the top end of the cylinder.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:
1. A hand operated extruding apparatus comprising
   (a) a base,
   (b) a tubular cylinder for holding extrudable material,
   (c) means supporting said cylinder on said base,
   (d) means defining an outlet aperture in said cylinder adjacent one end thereof through which extrudable material may be ejected,
   (e) a tubular die member mounted exteriorly of said cylinder,
   (f) said die member being movable rotatably and longitudinally on said cylinder and having a plurality of forming apertures disposed in two circumferential rows disposed adjacent opposite ends of said die member,
   (g) said forming apertures being of different shape whereby the cross sectional shape of the extrusion is arranged to be varied by rotatable movement of said die member on said cylinder, to align a selected forming aperture with said outlet aperture,
   (h) one of said rows of forming apertures being arranged to be aligned with said outlet aperture in one position of said die member and the other of said row of apertures being arranged to be aligned with said outlet aperture in an inverted position of said die member,
   (i) a plunger slidably operating through the end of said cylinder opposite from the end having the outlet aperture,
   (j) and a hand operated lever connected to said plunger for slidably operating the latter in said cylinder.
2. The hand operated extruding apparatus of claim 1 including
   (a) a projection on said base on which said cylinder is mounted,
   (b) fastening means releasably securing said cylinder to said projection,
   (c) said fastening means also serving as abutment means for said die member in locating the latter such that its forming apertures are aligned with said outlet aperture in the said one and inverted positions of said die member.

References Cited

UNITED STATES PATENTS

| | | | |
|---|---|---|---|
| 482,369 | 9/1892 | Kruck | 18—12 XR |
| 523,584 | 7/1894 | Mivelaz | 18—12 XR |
| 977,282 | 11/1910 | De Vilbiss | 18—12 |
| 1,741,023 | 12/1929 | Kajiwara | 18—12 XR |
| 2,578,105 | 12/1951 | Taylor. | |
| 3,001,485 | 9/1961 | Czik. | |
| 3,083,872 | 4/1963 | Meshberg | 222—533 XR |
| 3,157,933 | 11/1964 | Biggild et al. | 18—12 XR |
| 3,264,685 | 8/1966 | Boggild et al. | 25—11 XR |

FOREIGN PATENTS 19,938  1910  Great Britain.

WILLIAM J. STEPHENSON, *Primary Examiner.*

U.S. Cl. X.R.

18—12; 107—14